US012626430B2

(12) United States Patent
Yang

(10) Patent No.: US 12,626,430 B2
(45) Date of Patent: May 12, 2026

(54) IMAGE ANTI-ALIASING METHOD AND APPARATUS, DEVICE, MEDIUM, AND PROGRAM PRODUCT

(71) Applicant: TENCENT TECHNOLOGY (SHENZHEN) COMPANY LIMITED, Shenzhen (CN)

(72) Inventor: Yuning Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 189 days.

(21) Appl. No.: 18/680,340

(22) Filed: May 31, 2024

(65) Prior Publication Data

US 2024/0404140 A1    Dec. 5, 2024

Related U.S. Application Data

(63) Continuation of application No. PCT/CN2023/112837, filed on Aug. 14, 2023.

(30) Foreign Application Priority Data

Aug. 30, 2022    (CN) .......................... 202211045046.6

(51) Int. Cl.
G06T 11/40        (2006.01)
G06T 3/403        (2024.01)
        (Continued)

(52) U.S. Cl.
CPC .............. G06T 11/40 (2013.01); G06T 3/403 (2013.01); G06T 7/13 (2017.01); G06T 7/90 (2017.01);
        (Continued)

(58) Field of Classification Search
None
See application file for complete search history.

(56) References Cited

U.S. PATENT DOCUMENTS

2017/0272722 A1    9/2017    Salvi et al.

FOREIGN PATENT DOCUMENTS

CN        107483771 A    *    12/2017    ............. H04N 9/646
CN        111882498 A    *    11/2020    ............... G06T 5/94
        (Continued)

OTHER PUBLICATIONS

International Search Report for PCT/CN2023/112837 dated Nov. 20, 2023.
Written Opinion for PCT/CN2023/112837 dated Nov. 20, 2023.

*Primary Examiner* — Tapas Mazumder
(74) *Attorney, Agent, or Firm* — Sughrue Mion, PLLC

(57)        ABSTRACT

A method, apparatus, and a non-transitory computer-readable medium storing program code for anti-aliasing images may be provided. The method may include obtaining a first edge pixel of an image in a high-dynamic range (HDR) space and determining a first scaling factor based on a local brightness environment of the first edge pixel. The method may also include determining a color ratio corresponding with the first edge pixel and scaling the color ratio to obtain a first color ratio. Then the first color value is obtained based on a color value of the first edge pixel, a color value of a target pixel, and the first color ratio, wherein the target pixel has a large color value difference from the first edge pixel among a plurality of surrounding pixels of the first edge pixel; and updating the first color value to the color value of the first edge pixel.

20 Claims, 9 Drawing Sheets

(51) Int. Cl.
　　　*G06T 7/13*　　　　　(2017.01)
　　　*G06T 7/90*　　　　　(2017.01)
　　　*G06T 11/10*　　　　(2026.01)

(52) U.S. Cl.
　　　CPC .... *G06T 11/10* (2026.01); *G06T 2207/10024*
　　　　　　　　　　　　　　　　　　　　(2013.01)

(56)　　　　　　　　　References Cited

FOREIGN PATENT DOCUMENTS

| | | | |
|---|---|---|---|
| CN | 112700385 A | 4/2021 | |
| CN | 113538271 A | 10/2021 | |
| WO | WO-2022142876 A1 * | 7/2022 | ........... G06F 3/0488 |

* cited by examiner

A value of a sub-pixel anti-
aliasing quality parameter is 1

A value of a sub-pixel anti-
aliasing quality parameter is 0

Anti-aliasing
effect in a
highlight part
of an image

FIG. 1A                    FIG. 1B

Representation
of image details

FIG. 1C                    FIG. 1D

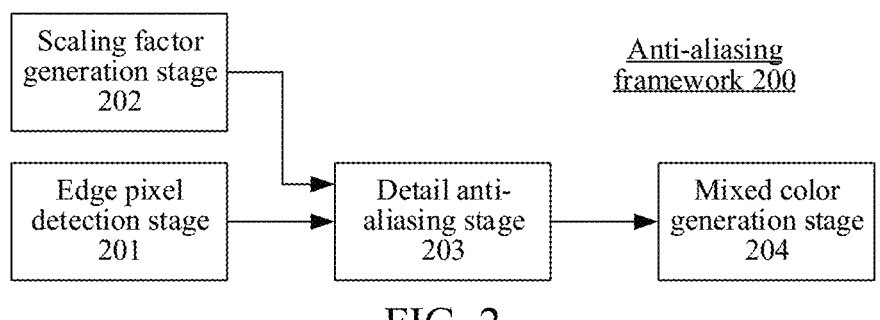

Anti-aliasing
framework 200

| Scaling factor generation stage 202 |
| Edge pixel detection stage 201 |
| Detail anti-aliasing stage 203 |
| Mixed color generation stage 204 |

FIG. 2

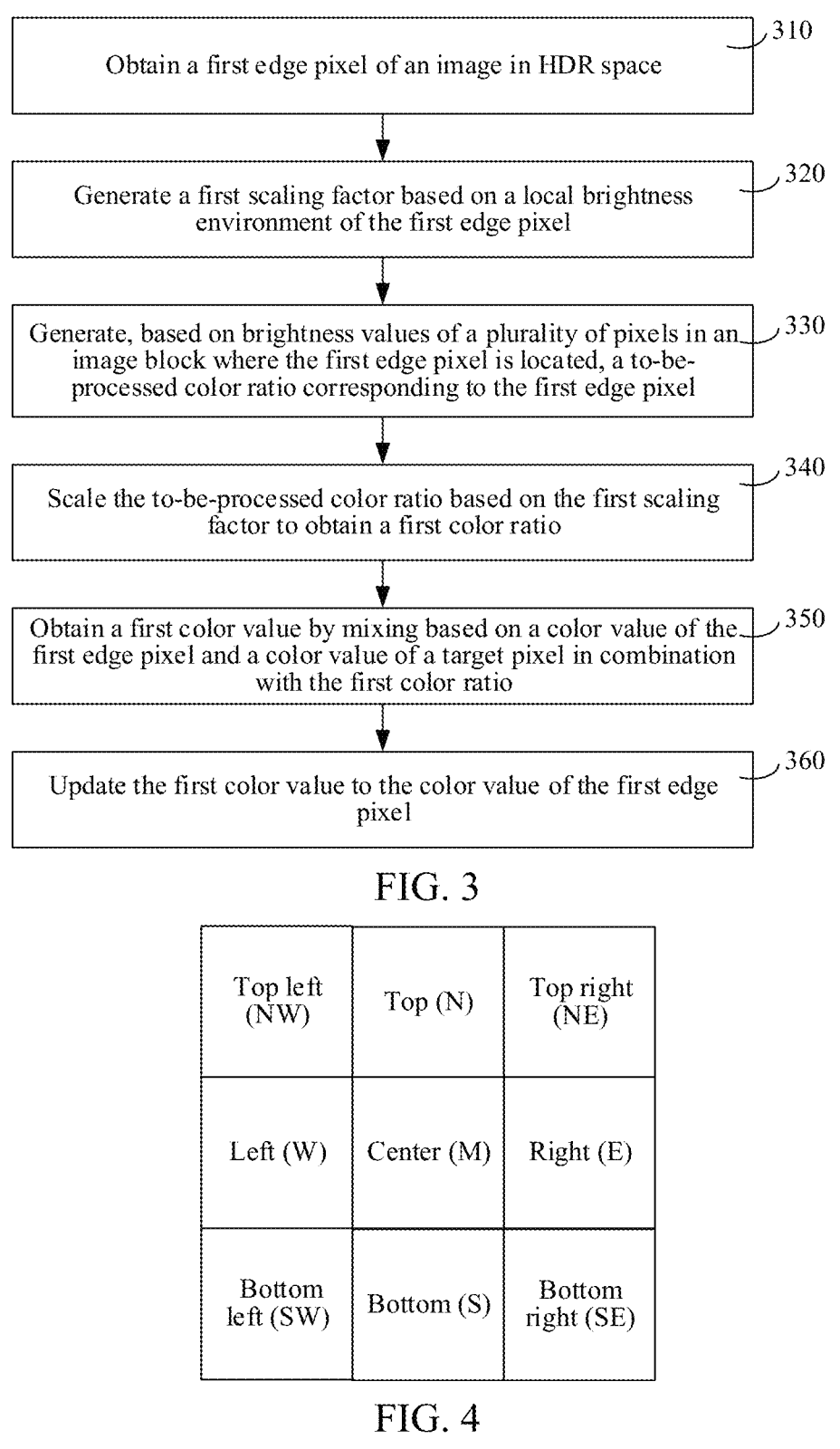

Obtain a first edge pixel of an image in HDR space /310

Generate a first scaling factor based on a local brightness environment of the first edge pixel /320

Generate, based on brightness values of a plurality of pixels in an image block where the first edge pixel is located, a to-be-processed color ratio corresponding to the first edge pixel /330

Scale the to-be-processed color ratio based on the first scaling factor to obtain a first color ratio /340

Obtain a first color value by mixing based on a color value of the first edge pixel and a color value of a target pixel in combination with the first color ratio /350

Update the first color value to the color value of the first edge pixel /360

FIG. 3

| Top left (NW) | Top (N) | Top right (NE) |
|---|---|---|
| Left (W) | Center (M) | Right (E) |
| Bottom left (SW) | Bottom (S) | Bottom right (SE) |

FIG. 4

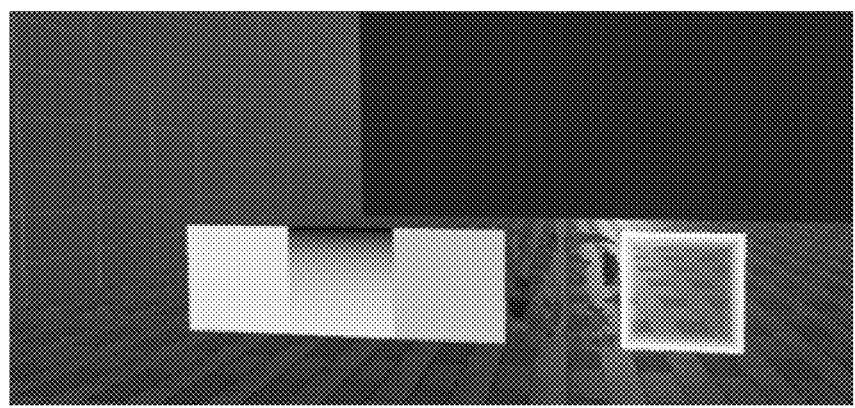
FIG. 5A
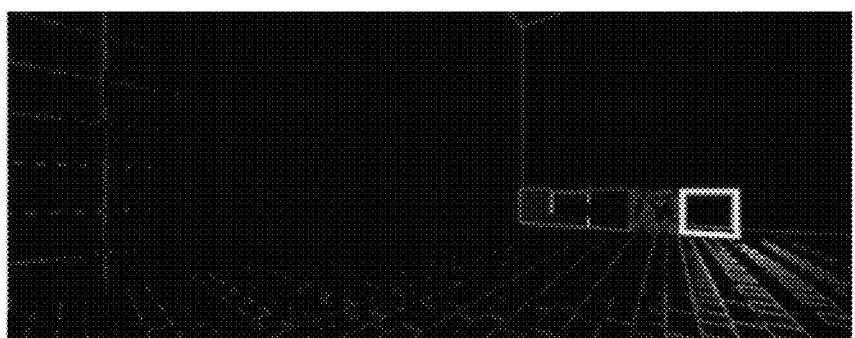
FIG. 5B
| 1 | 2 | 1 |
|---|---|---|
| 2 | -12 | 2 |
| 1 | 2 | 1 |
FIG. 6

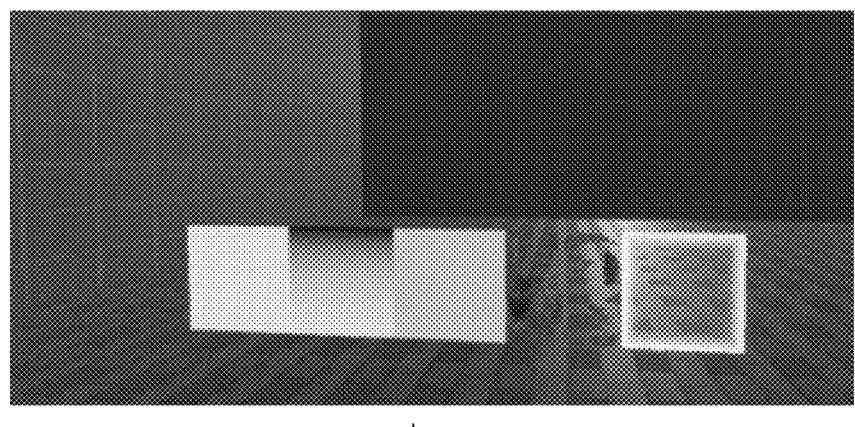
FIG. 10A
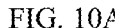
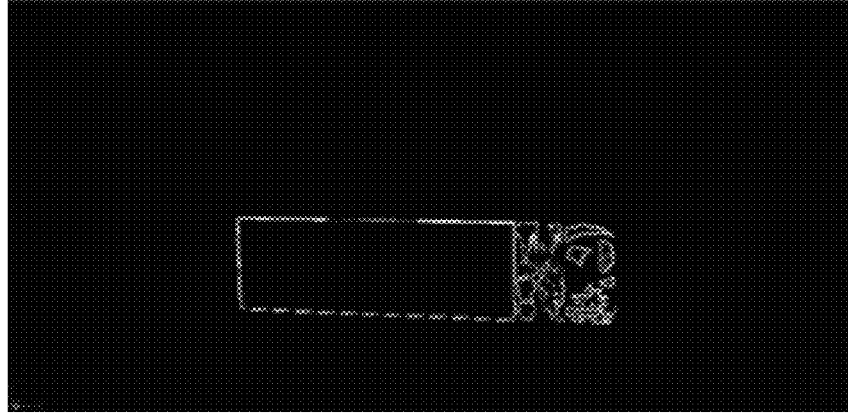
FIG. 10B
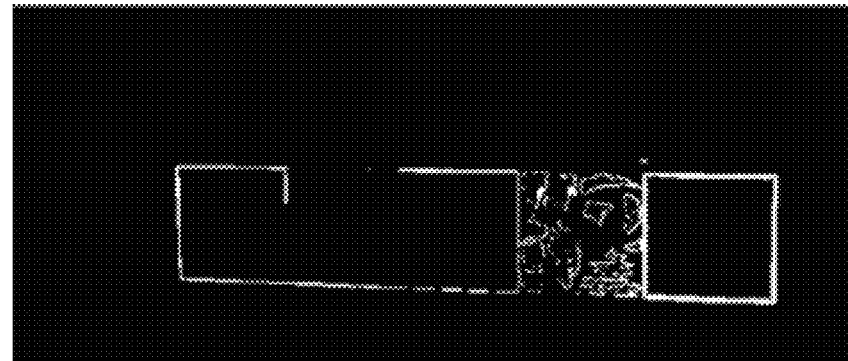
FIG. 10C

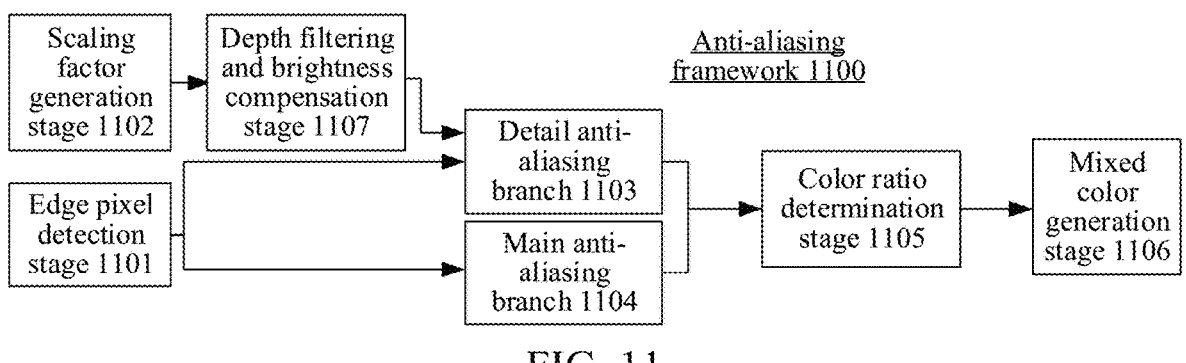
FIG. 11
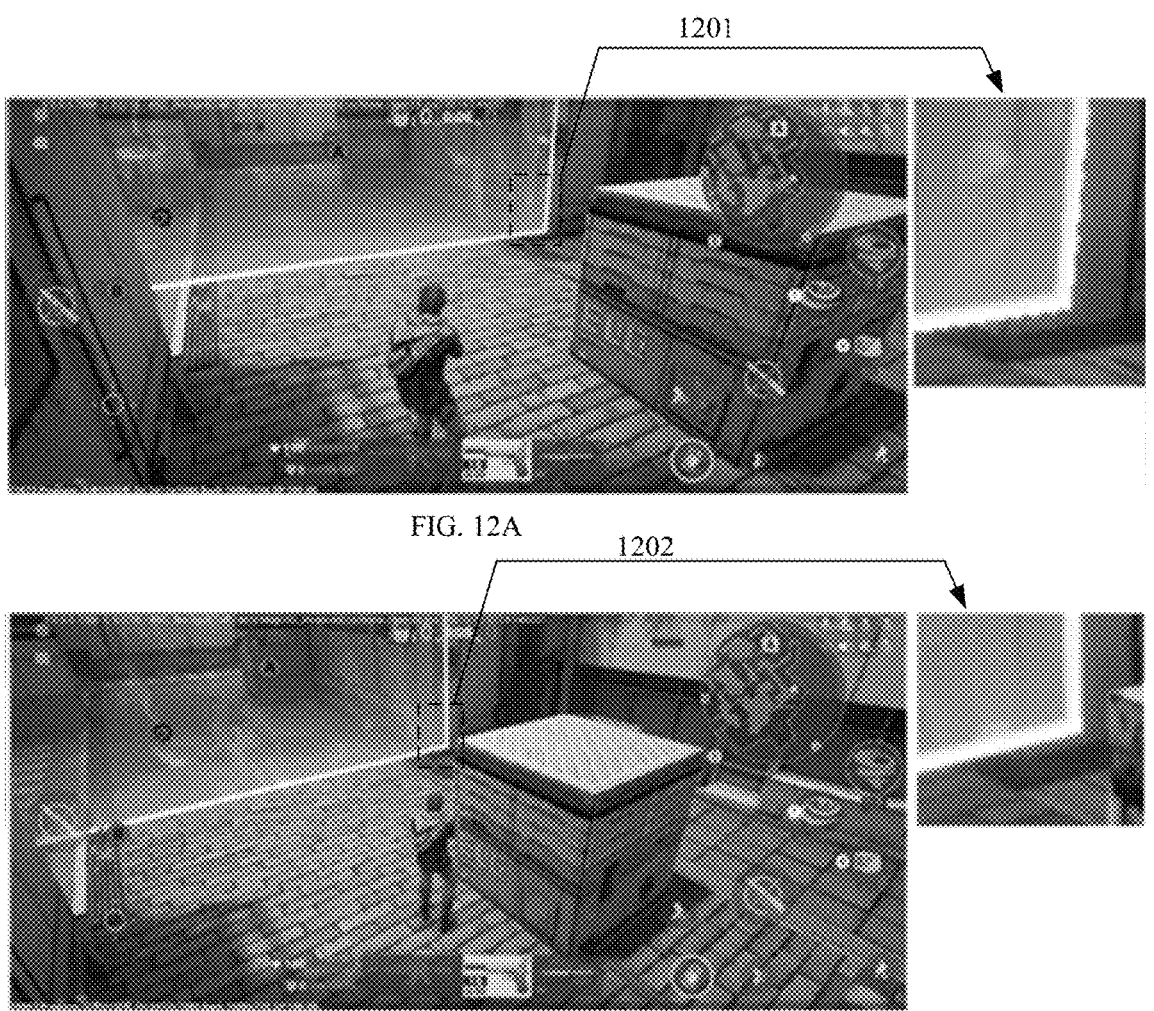
FIG. 12A
FIG. 12B

Original image

A value of a sub-pixel anti-aliasing quality parameter is 0

A value of a sub-pixel anti-aliasing quality parameter is 1

This application

IMAGE ANTI-ALIASING METHOD AND APPARATUS, DEVICE, MEDIUM, AND PROGRAM PRODUCT

CROSS-REFERENCES TO RELATED APPLICATIONS

This application is a continuation of International Application No. PCT/CN2023/112837, filed on Aug. 14, 2023, at the China National Intellectual Property Administration, which claims priority to Chinese Patent Application No. 202211045046.6, filed with the China National Intellectual Property Administration on Aug. 30, 2022, the disclosures of which are incorporated by reference in their entireties.

FIELD

Embodiments of the present disclosure relate to the field of image rendering, and in particular, to an image anti-aliasing method and apparatus, a device, a medium, and a program product.

BACKGROUND

Aliasing refers to a phenomenon where geometric lines rendered are jagged due to low pixel accuracy during an image rendering process. The technical means of eliminating aliasing is called anti-aliasing. During image rendering, one image frame can be rendered through a plurality of rendering processes (passes). Each pass is a complete rendering process for one image frame.

In a related technology, a fast approximate anti-aliasing (FXAA) solution that merges rendering processes is provided. According to this solution, tone mapping and an FXAA algorithm are completed within one rendering process. Tone mapping refers to mapping a high-dynamic range (HDR) space tone to low-dynamic range (LDR) space. In the FXAA solution that merges rendering processes, the FXAA algorithm acts directly on edges in HDR space.

The FXAA solution that merges rendering processes includes a main anti-aliasing branch and a detail anti-aliasing branch. The main anti-aliasing branch is configured to de-alias major edge lines macroscopically. The detail anti-aliasing branch is configured to perform anti-aliasing on individual edge pixels to process edges that are not covered by the main anti-aliasing branch. Affected by a specific algorithm of the main anti-aliasing branch, the main anti-aliasing branch cannot eliminate aliasing in a highlight area in the HDR space. The detail anti-aliasing branch is needed to eliminate the aliasing in the highlight area in the HDR space.

However, the detail anti-aliasing branch is based on a sub-pixel anti-aliasing quality parameter (SubPixQuality). When a value of the sub-pixel anti-aliasing quality parameter is 0, anti-aliasing is not performed on edges of image details. In this case, the image details are clear, but distinct aliasing exists in the highlight area. When the value of the sub-pixel anti-aliasing quality parameter is 1, a maximum anti-aliasing effect is realized at the edges of the image details, and an optimal anti-aliasing effect is achieved at an edge of the highlight area, but the image details are blurred. Therefore, in the FXAA solution that merges rendering processes, the value of the sub-pixel anti-aliasing quality parameter is continuously adjusted to balance clarity of the image details and the anti-aliasing effect in the highlight area. In spite of continuously adjusting the value of the sub-pixel anti-aliasing quality parameter, the clarity of the image details and the anti-aliasing effect in the highlight area cannot be balanced effectively.

SUMMARY

The present disclosure provides an image anti-aliasing method and apparatus, a device, a medium, and a program products, to solve the contradiction between clarity of image details and an anti-aliasing effect in a highlight area in a detail anti-aliasing branch.

According to one aspect of the present disclosure, an image anti-aliasing method is provided. The method includes obtaining a first edge pixel of an image in a high-dynamic range (HDR) space; determining a first scaling factor based on a local brightness environment of the first edge pixel; determining a color ratio corresponding with the first edge pixel based on brightness values of a plurality of pixels in an image block where the first edge pixel is located; scaling the color ratio based on the first scaling factor to obtain a first color ratio; obtaining a first color value based on a color value of the first edge pixel, a color value of a target pixel, and the first color ratio, wherein the target pixel has a large color value difference from the first edge pixel among a plurality of surrounding pixels of the first edge pixel; and updating the first color value to the color value of the first edge pixel.

According to an aspect of the present disclosure, an image anti-aliasing apparatus is provided. The apparatus includes at least one memory configured to store program code; and at least one processor configured to read the program code and operate as instructed by the program code. The program code may include first obtaining code configured to cause the at least one first processor to obtain a first edge pixel of an image in a high-dynamic range (HDR) space; first determining code configured to cause the at least one first processor to determine a first scaling factor based on a local brightness environment of the first edge pixel; second determining code configured to cause the at least one first processor to determine a color ratio corresponding with the first edge pixel based on brightness values of a plurality of pixels in an image block where the first edge pixel is located; first scaling code configured to cause the at least one first processor to scale the color ratio based on the first scaling factor to obtain a first color ratio; second obtaining code configured to cause the at least one first processor to obtain a first color value based on a color value of the first edge pixel, a color value of a target pixel, and the first color ratio, wherein the target pixel has a large color value difference from the first edge pixel among a plurality of surrounding pixels of the first edge pixel; and first updating code configured to cause the at least one first processor to update the first color value to the color value of the first edge pixel.

According to one aspect of the present disclosure, a non-transitory computer-readable storage medium is provided. The non-transitory computer-readable storage medium may include program code which, when executed by one or more processors of a device for image anti-aliasing, may cause the one or more processors to at least: obtain a first edge pixel of an image in a high-dynamic range (HDR) space; determine a first scaling factor based on a local brightness environment of the first edge pixel; determine a color ratio corresponding with the first edge pixel based on brightness values of a plurality of pixels in an image block where the first edge pixel is located; scale the color ratio based on the first scaling factor to obtain a first color ratio; obtain a first color value based on a color value of the first edge pixel, a color value of a target pixel, and the first color ratio, wherein the target pixel has a large color value difference from the first edge pixel among a plurality of surrounding pixels of the first edge pixel; and update the first color value to the color value of the first edge pixel.

BRIEF DESCRIPTION OF THE DRAWINGS

FIG. 1A-FIG. 1D are schematic diagrams of an anti-aliasing effect of a fast approximate anti-aliasing (FXAA) solution that merges rendering processes according to an exemplary embodiment.

FIG. 2 is a schematic diagram of an image anti-aliasing framework according to an exemplary embodiment.

FIG. 3 is a flowchart of an image anti-aliasing method according to an exemplary embodiment.

FIG. 4 is a schematic diagram of an image block according to an exemplary embodiment.

FIG. 5A-FIG. 5B are schematic diagrams of a process of generating scaling factors according to an exemplary embodiment.

FIG. 6 is a schematic diagram of brightness weights of an image block according to an exemplary embodiment.

FIG. 10A-FIG. 10C are schematic diagrams of a depth filtering and brightness compensation process according to an exemplary embodiment.

FIG. 11 is a schematic diagram of an image anti-aliasing framework according to another exemplary embodiment.

FIG. 12A-FIG. 12B are schematic diagrams of comparison of an anti-aliasing effect between an FXAA solution that merges rendering processes according to an exemplary embodiment.

DETAILED DESCRIPTION

Figure 7:
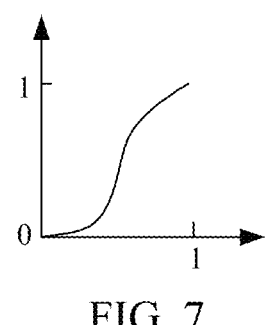
FIG. 7 is a schematic diagram of a mapping relationship between a brightness difference and a to-be-processed color ratio according to an exemplary embodiment.

Embodiments of the present disclosure relate to balancing clarity of image details and an anti-aliasing effect of a highlight area caused by using only one sub-pixel. By generating a scaling factor of each edge pixel of an image in HDR space, a customized scaling factor is generated for each edge pixel, so that color mixing of each edge pixel is based on its own scaling factor, thereby effectively solving the contradiction between clarity of image details and an anti-aliasing effect of a highlight area caused by using only one sub-pixel anti-aliasing quality parameter for an entire image frame in the detail anti-aliasing branch.

The embodiments of the present disclosure achieves a good anti-aliasing effect on the edge of the highlight area and ensures the clarity of image details that merges rendering processes.

Initially, terms involved in embodiments of the present disclosure are briefly introduced.

High-dynamic range (HDR): HDR is a rendering technology that can achieve an effect more like real-world lighting. Compared with low dynamic range (LDR), a maximum brightness value of pixels in HDR can exceed 1. The HDR technology is used for simulating and calculating real light intensity. A maximum brightness value of pixels in LDR is 1. An image in LDR space are suitable for screen rendering. In related art, HDR colors are mapped to LDR through tone mapping, and finally rendered to a screen.

Post-processing stage: It is a rendering stage in game rendering after scene object rendering and character rendering. In this stage, adjustment, such as tone adjustment and anti-aliasing, can be performed on a final rendered image. In related art, tone mapping is performed in the post-processing stage.

Rendering process (pass): During image rendering, one image frame may be rendered through a plurality of rendering processes (passes). Each pass is a complete rendering process, including a series of rendering procedures such as vertex rendering and fragment rendering. In related art, tone mapping is a complete rendering process.

Fast approximate anti-aliasing (FXAA): It is a post-processing-based anti-aliasing solution. In FXAA, anti-aliasing is performed on a currently rendered image through a separate post-processing rendering process. During the post-processing rendering process, a shader receives an input sub-pixel anti-aliasing quality parameter (SubPixQuality) and performs detail anti-aliasing processing based on the sub-pixel anti-aliasing quality parameter.

When a value of the input sub-pixel anti-aliasing quality parameter is 0, anti-aliasing is not performed on image details (detailed edges in an image, such as leaves and fine textures on a wall). In this case, the image details are sharp. When the value of the input sub-pixel anti-aliasing quality parameter is 1, a maximum anti-aliasing effect of the image details is realized. In this case, the image details are blurred. The sub-pixel anti-aliasing quality parameter only takes effect on image details in the detail anti-aliasing branch, and does not affect the anti-aliasing effect on macro major lines (such as contour edges of a large object in a scene).

In FXAA, pixel colors in HDR space need to be mapped to pixel colors in the LDR space through tone mapping in one rendering process, and then FXAA processing is performed in another rendering process. In other words, FXAA is implemented through split rendering processes. The solution that splits rendering processes consumes bandwidth corresponding to two rendering processes, and when used in a mobile terminal, leads to poor performance of the mobile terminal because bandwidth of a processor of the mobile terminal is limited.

To solve the problem of excessive performance consumption caused by the solution that splits rendering processes, a solution that merges rendering processes is also proposed in a related technology. The solution that merges rendering processes mainly includes the following two types:

Local tone mapping: An FXAA algorithm can achieve a good anti-aliasing effect in the LDR space. According to this solution, in a rendering process, a current pixel in the HDR space is first tone-mapped to the LDR space, and then FXAA calculation is performed on the current calculation pixel. In this case, the calculation result is the same as the anti-aliasing effect of the solution that splits rendering processes.

However, to tone-map the current pixel to the LDR space, it is required to search a lookup table (LUT) for a color value (a to-be-mapped HDR value) of the current pixel in the HDR space and color values (a plurality of HDR values required for mapping) of a plurality of pixels including the current pixel in the HDR space. Therefore, an HDR value of the current pixel needs to be sampled twice from the LUT. For the mobile terminal, the bandwidth consumed by this solution is still excessively high.

Parameter adjustment: In this solution, the FXAA algorithm is directly used for an image in the HDR space. According to this solution, when the value of the sub-pixel anti-aliasing quality parameter is 0, anti-aliasing processing is not performed on image details. In this case, the overall image is clear, but the anti-aliasing effect in a highlight part is poor. When the value of the sub-pixel anti-aliasing quality parameter is 1, the strongest anti-aliasing processing is performed on the image details. In this case, the overall image is blurred, but the anti-aliasing effect in the highlight part is good due to a blurring effect.

Exemplarily, FIGS. 1A and 1B show the anti-aliasing effect in a highlight part of an image when the sub-pixel anti-aliasing quality parameter is 1 and 0, respectively. It can be seen that the anti-aliasing effect of edge lines in the highlight part when the sub-pixel anti-aliasing quality parameter is equal to 1 is better than the anti-aliasing effect of the edge lines in the highlight part when the sub-pixel anti-aliasing quality parameter is equal to 0. FIGS. 1C and 1D show the representation of the image details when the value of sub-pixel anti-aliasing quality parameter is 1 and 0, respectively. It can be seen that when the sub-pixel anti-aliasing quality parameter is equal to 1, the image undergone anti-aliasing is blurrier than that when the sub-pixel anti-aliasing quality parameter is equal to 0.

Therefore, there is a contradiction between image clarity and an anti-aliasing effect in the highlight part when the FXAA algorithm is directly used in the HDR space. An excessively small sub-pixel anti-aliasing quality parameter results in a poor anti-aliasing effect in the highlight area, and an excessively large sub-pixel anti-aliasing quality parameter causes details in the image to become blurry.

To sum up, both the solution that splits rendering processes and the solution that merges rendering processes mentioned above have their own shortcomings. In view of this, the present disclosure provides an image anti-aliasing method in HDR space.

FIG. 2 is a schematic diagram of an image anti-aliasing framework according to an exemplary embodiment of the present disclosure. The image anti-aliasing framework 200 includes an edge pixel detection stage 201, a scaling factor generation stage 202, a detail anti-aliasing stage 203, and a mixed color generation stage 204.

The edge pixel detection stage 201 is configured for detecting all edge pixels in an image in HDR space. All the edge pixels obtained in the edge pixel detection stage 201 are input to the detail anti-aliasing stage 203.

The scaling factor generation stage 202 is configured for generating scaling factors respectively corresponding to all edge pixels of the image in the HDR space. The scaling factor is configured for dynamically adjusting a color ratio of each edge pixel.

The detail anti-aliasing stage 203 is configured for generating the color ratios of all edge pixels. For each edge pixel, in the detail anti-aliasing stage 203, a to-be-processed color ratio corresponding to the edge pixel is generated, and the to-be-processed color ratio of the edge pixel is adjusted based on a scaling factor corresponding to the edge pixel, to obtain a color ratio corresponding to the edge pixel.

The mixed color generation stage 204 is configured for color mixing of all edge pixels of the image to obtain an image anti-aliasing effect. For each edge pixel, a target pixel for color mixing corresponding to the edge pixel is determined. A final color of the edge pixel is obtained by mixing based on a color of the edge pixel and a color of the target pixel in combination with the color ratio determined above. The color mixing is performed on all edge pixels of the image, to obtain an image undergone anti-aliasing.

In one embodiment, the image anti-aliasing framework 200 runs on a terminal. In one embodiment, the image anti-aliasing framework 200 is executed by a shader in the terminal. In one embodiment, the image anti-aliasing framework 200 is configured to render an image frame of an application, and the application runs on an operating system platform (Android or IOS). In one embodiment, the terminal includes at least one of a smart phone, a tablet computer, a wearable device, a smart TV, an on-board terminal, an E-book reader, an MP3 player, an MP4 player, a laptop computer, and a desk computer. An example in which the terminal includes a smart phone is used for description in the following embodiments.

FIG. 3 is a flowchart of an image anti-aliasing method according to an exemplary embodiment of the present disclosure. An example in which the method is performed by a terminal is used for description. The method includes the following operations.

Operation 310: Obtain a first edge pixel of an image in HDR space.

The first edge pixel refers to a pixel in an image block where a pixel difference reaches a threshold. In one embodiment, the first edge pixel refers to a pixel in an image block where a brightness value difference reaches a threshold. In one embodiment, the first edge pixel refers to a pixel of which a brightness value difference reaches a threshold among a plurality of pixels in an image block.

The image block where the first edge pixel is located is a square pixel array sectioned with the first edge pixel as the center. Refer to FIG. 4. FIG. 4 shows the image block where the first edge pixel is located. The pixel indicated by M is the first edge pixel. N, S, W, and E indicate pixels at the top, bottom, left, and right positions with respect to the first edge pixel. NW, SW, NE, and SE indicate pixels at the top left, bottom left, top right, and bottom right positions with respect to the first edge pixel.

The first edge pixel is any one of all edge pixels of the image in the HDR space.

Operation 310 is performed in the edge pixel detection stage 201 in the anti-aliasing framework 200 shown in FIG. 2.

In one embodiment, before the first edge pixel of the image in the HDR space is obtained, all edge pixels of the image need to be detected. The operations to detect all edge pixels of the image include: after obtaining the image in the HDR space, obtaining, for a $j^{th}$ pixel of the image, a pixel having a largest brightness value and a pixel having a smallest brightness value among a plurality of pixels in an image block where the $j^{th}$ pixel is located, j being a positive integer; determining that the $j^{th}$ pixel is an edge pixel when a brightness value difference between the pixel having the largest brightness value and the pixel having the smallest brightness value among the pixels in the image block where the $j^{th}$ pixel is located reaches a $j^{th}$ threshold; and determining a plurality of edge pixels of the image. The $j^{th}$ pixel is any pixel in the image. In one embodiment, the $j^{th}$ threshold is a preset brightness value difference threshold. In one embodiment, the same brightness value difference threshold is used for edge pixel detection in the same image.

Refer to FIG. 4. FIG. 4 shows an image block in the image. The pixel indicated by M is the $j^{th}$ pixel. N, S, W, and E indicate pixels at the top, bottom, left, and right positions with respect to the $j^{th}$ pixel. NW, SW, NE, and SE indicate pixels at the top left, bottom left, top right, and bottom right positions with respect to the $j^{th}$ pixel.

In one embodiment, the pixel having the largest brightness value and the pixel having the smallest brightness value are determined from among all pixels in the image block shown in FIG. 4. In one embodiment, the pixel having the largest brightness value and the pixel having the smallest brightness value are determined from among the plurality of pixels indicated by N, S, W, and E. In one embodiment, the pixel having the largest brightness value and the pixel having the smallest brightness value are determined from among the plurality of pixels indicated by NW, SW, NE, and SE.

Operation 320: Generate a first scaling factor based on a local brightness environment of the first edge pixel.

Operation 320 is performed in the scaling factor generation stage 202 in the anti-aliasing framework 200 shown in FIG. 2.

The first scaling factor refers to a scaling factor configured for adjusting the to-be-processed color ratio corresponding to the first edge pixel. The color ratio is configured for mixing the color of the first edge pixel and the color of the target pixel.

The local brightness environment refers to the brightness inside the image block where the first edge pixel is located. In one embodiment, the local brightness environment is measured based on a maximum brightness value and a minimum brightness value inside the image block where the first edge pixel is located. In one embodiment, the local brightness environment refers to the brightness of the plurality of pixels inside the image block where the first edge pixel is located. In one embodiment, the local brightness environment is measured based on the maximum brightness value and the minimum brightness value of the plurality of pixels inside the image block where the first edge pixel is located.

Refer to FIG. 4. FIG. 4 may also be understood as the image block where the first edge pixel is located. M indicates the first edge pixel. N, S, W, and E indicate pixels at the top, bottom, left, and right positions with respect to the first edge pixel. NW, SW, NE, and SE indicate pixels at the top left, bottom left, top right, and bottom right positions with respect to the first edge pixel.

In one embodiment, the local brightness environment of the first edge pixel refers to the brightness of all pixels in the image block shown in FIG. 4. In one embodiment, the local brightness environment of the first edge pixel refers to the brightness of the four pixels indicated by N, S, W, and E. In one embodiment, the local brightness environment of the first edge pixel refers to the brightness of the four pixels indicated by NW, SW, NE, and SE.

Operation 330: Generate, based on brightness values of a plurality of pixels in an image block where the first edge pixel is located, a to-be-processed color ratio corresponding to the first edge pixel.

Operation 330 is performed in the detail anti-aliasing stage 203 in the anti-aliasing framework 200 shown in FIG. 2.

In one embodiment, the image block where the first edge pixel is located is a square pixel array, as shown in FIG. 4. The to-be-processed color ratio corresponding to the first edge pixel is generated based on brightness values of all pixels in the image block.

Operation 340: Scale the to-be-processed color ratio based on the first scaling factor to obtain a first color ratio.

Operation 340 is performed in the detail anti-aliasing stage 203 in the anti-aliasing framework 200 shown in FIG. 2.

In one embodiment, the first color ratio corresponding to the first edge pixel is obtained based on the first scaling factor obtained in operation 320 and the to-be-processed color ratio obtained in operation 330. In one embodiment, the first scaling factor is multiplied by the to-be-processed color ratio to obtain the first color ratio.

Exemplarily, the first color ratio is calculated by the following formula:

$$AA_{sub} = A_{sub0} * f.$$

$AA_{sub}$ is the first color ratio obtained by scaling, $AA_{sub0}$ is the to-be-processed color ratio, and f is the first scaling factor.

Operation 350: Obtain a first color value by mixing based on a color value of the first edge pixel and a color value of a target pixel in combination with the first color ratio.

Operation 350 is performed in the mixed color generation stage 204 in the anti-aliasing framework 200 shown in FIG. 2.

The target pixel is a pixel having a largest color value difference from the first edge pixel among a plurality of surrounding pixels of the first edge pixel. Refer to FIG. 4. The first edge pixel is the pixel indicated by M. In one embodiment, the target pixel is a pixel having a largest color value difference from the pixel indicated by M among a plurality of surrounding pixels indicated by N, S, W, and E. In one embodiment, the target pixel is a pixel having a largest color value difference from the pixel indicated by M among a plurality of surrounding pixels indicated by NW, SW, NE, and SE. In one embodiment, the target pixel is a pixel having a largest color value difference from the pixel indicated by M among a plurality of surrounding pixels indicated by N, S, W, E, NW, SW, NE, and SE.

In one embodiment, the target pixel is determined based on an edge direction of the first edge pixel. In one embodiment, after all edge pixels of the image are detected, edge directions respectively corresponding to the edge pixels are also calculated, and the edge directions are stored in a lookup table. In one embodiment, the edge direction is a vertical direction or a horizontal direction. The target pixel is a pixel that crosses an edge and is located at a shortest distance from the first edge pixel in a direction perpendicular to the edge direction. In one embodiment, if a brightness difference between pixels at the top and bottom of an edge pixel is larger than a brightness difference between pixels at the left and right, it is determined that the edge direction of the edge pixel is the horizontal direction. If the brightness difference between pixels on the left and right of the edge pixel is larger than the brightness difference between the pixels at the top and bottom, it is determined that the edge direction of the edge pixel is the vertical direction. In one embodiment, the edge direction of the first edge pixel is the horizontal direction, and a color of the top pixel is closer to a color of the first edge pixel than a color of the bottom pixel. In this case, the pixel at the bottom of the first edge pixel is determined as the target pixel, which is called crossing an edge. In one embodiment, the edge direction of the first edge pixel is the vertical direction, and the color of the right pixel is closer to the color of the first edge pixel than the color of the left pixel. In this case, the pixel on the left of the first edge pixel is determined as the target pixel, which is called crossing an edge. For example, if the edge direction of the first edge pixel is from left to right and the direction perpendicular to the edge direction is from bottom to top, then the target pixel is the first pixel above the first edge pixel. For example, if the edge direction of the first edge pixel is from top to bottom and the direction perpendicular to the edge direction is from left to right, then the target pixel is the first pixel to the right of the first edge pixel.

The color value of the target pixel determined based on the edge direction has a largest difference from that of the first edge pixel among the plurality of surrounding pixels of the first edge pixel.

The first color value can be obtained by mixing based on the color value of the first edge pixel and the color value of the target pixel in combination with the first color ratio.

Operation 360: Update the first color value to the color value of the first edge pixel.

The first color value obtained by mixing in operation 350 is updated to the color value of the first edge pixel. In view of this, the same operation is performed on all the edge pixels of the image in the HDR space to achieve anti-aliasing processing of the image in the HDR space.

For the operation 320 and operation 330, operation 320 may be performed first and then operation 330, or operation 330 may be performed first and then operation 320, or operation 320 and operation 330 may be performed simultaneously, which is not limited in the present disclosure.

In view of the above, by generating a scaling factor of each edge pixel of an image in HDR space, a customized scaling factor is generated for each edge pixel, so that color mixing of each edge pixel is based on its own scaling factor, thereby effectively solving the contradiction between clarity of image details and an anti-aliasing effect of a highlight area caused by using only one sub-pixel anti-aliasing quality parameter for an entire image frame in the detail anti-aliasing branch.

The anti-aliasing method of the present disclosure achieves a good anti-aliasing effect on the edge of the highlight area and ensures the clarity of image details through the detail anti-aliasing branch of the FXAA solution that merges rendering processes.

Next, content related to the operations in the method embodiment shown in FIG. 3 is to be introduced in detail.

In a same or another embodiment based on FIG. 3, "generate a first scaling factor based on a local brightness environment of the first edge pixel" in operation 320 may be replaced with: generate a first scaling factor based on a brightness value of a first surrounding pixel and a brightness value of a second surrounding pixel.

The first surrounding pixel is a pixel having a largest brightness value among the plurality of pixels in the image block where the first edge pixel is located, and the second surrounding pixel is a pixel having a smallest brightness value among the plurality of pixels in the image block where the first edge pixel is located.

Refer to FIG. 4. M in FIG. 4 indicates the first edge pixel. In one embodiment, the first surrounding pixel and the second surrounding pixel are determined from all pixels in the image block shown in FIG. 4. In one embodiment, the first surrounding pixel and the second surrounding pixel are determined from the plurality of surrounding pixels indicated by N, S, W and E shown in FIG. 4. In one embodiment, the first surrounding pixel and the second surrounding pixel are determined from the plurality of surrounding pixels indicated by NW, SW, NE and SE shown in FIG. 4.

In one embodiment, the brightness value of the first surrounding pixel and the brightness value of the second surrounding pixel are input into a scaling function to obtain the first scaling factor. The scaling function satisfies: the greater the brightness value of the first surrounding pixel, the larger the first scaling factor; the smaller the brightness value of second surrounding pixel, the smaller the first scaling factor; and when the brightness value of the second surrounding pixel is 0, a value of the first scaling factor is equal to 0.

A derivation process of the scaling function is as follows:

Because the purpose of the scaling factor is to adjust color ratios of edge pixels, the scaling function needs to be able to perceive the brightness environment of the edge pixels, to obtain different scaling factors for the edge pixels having different brightness values.

First, a general formula of the scaling function is set as:

$$F = (a * \text{Luma}_{min} + b)^x * (c * \text{Luma}_{max} + d)^y + e.$$

F is the scaling factor to be solved for by the scaling function. $\text{Luma}_{min}$ and $\text{Luma}_{max}$ are respectively a pixel having a smallest brightness value and a pixel having a largest brightness value among a plurality of pixels in an image block where an edge pixel is located. a, c, x, y, b, d, and e are undetermined elements in the general formula.

The scaling function needs to meet the following two conditions:

1. The anti-aliasing effect in a highlight part of the image is good, i.e., $\text{Luma}_{max}$ is positively correlated with F. When $\text{Luma}_{max}$ is greater, the value of F is greater.
2. The clarity of a low-brightness edge of the image is protected, i.e., $\text{Luma}_{min}$ is positively correlated with F. When $\text{Luma}_{min}$ is smaller, the value of F is smaller, and when $\text{Luma}_{min}$ approaches 0, F also approaches 0.

To satisfy condition 2, e and b in the general formula are discarded. Moreover, to reduce calculation time consumed by a shader, x and y in the general formula are simplified to 1, and the general formula is simplified as follows:

$$F = (a * \text{Luma}_{min}) * (c * \text{Luma}_{max} + d).$$

To simplify the calculation while ensuring a good effect, the general function formula is further simplified to obtain a final scaling function:

$$F = \text{Luma}_{min} * (\text{Luma}_{max} + 1).$$

It can be seen that the scaling function only performs one multiplication calculation and one addition calculation, and only consumes one MAD calculation instruction during a calculation process of the shader. The MAD calculation instruction does not consume too much calculation resources.

After the scaling function has been constructed, a process of calculating the first scaling factor for the first edge pixel of the image in HDR space is as follows: multiplying a first brightness value by a second brightness value to obtain a first sub-scaling factor; using the second brightness value as a second sub-scaling factor; and summing the first sub-scaling factor and the second sub-scaling factor and then performing normalization processing to obtain the first scaling factor.

The first brightness value is the brightness value of the first surrounding pixel. The second brightness value is the brightness value of the second surrounding pixel.

FIG. 5A shows an original image in HDR space. FIG. 5B shows scaling factors corresponding to all pixels of the image in the HDR space. Brightness values of the pixels in FIG. 5B is values of the scaling factors. It can be seen that a value of the calculated scaling factor for the highlight area in the original image is greater, and a value of the calculated scaling factor for a low-brightness area in the original image is smaller.

The present disclosure provides specific content of the scaling function. To ensure that the detail anti-aliasing branch can be used for anti-aliasing of the edges of a highlight area, when the maximum brightness value in the environment of the first edge pixel of the highlight area is greater, the first scaling factor corresponding to the first edge pixel is to be larger. To ensure the clarity of low-brightness edge pixels, when the minimum brightness value in the environment of the first edge pixel is smaller, the first scaling factor is to be smaller. Moreover, when the minimum brightness value in the environment of the first edge pixel tends to 0, the first scaling factor is to also tend to 0.

In a same or another embodiment based on FIG. 3, operation 330 may be replaced with: obtaining a plurality of brightness weights of the plurality of pixels in the image block where the first edge pixel is located; generating a first brightness difference based on brightness and a brightness weight of each pixel in the image block; and mapping the first brightness difference to obtain the to-be-processed color ratio.

The plurality of pixels in the image block are in one-to-one correspondence with the plurality of brightness weights. The first brightness difference is configured for characterizing the local brightness environment of the first edge pixel.

Refer to FIG. 4. The first brightness difference of the first edge pixel is generated based on the brightness value of each pixel in the image block shown in FIG. 4 and the brightness weight corresponding to each pixel. The first brightness difference is configured for characterizing a difference between the brightness of the first edge pixel and overall brightness of the image block.

In one embodiment, the image block is a square pixel array centered on the first edge pixel. The plurality of brightness weights of the plurality of pixels in the image block satisfy the following conditions:

pixels in the square pixel array that are at a same distance from the first edge pixel have a same brightness weight;

pixels in the square pixel array that are closer to the first edge pixel have smaller brightness weights;

the brightness weights corresponding to other pixels in the square pixel array than the first edge pixel are positive numbers, and the brightness weight corresponding to the first edge pixel is a negative number; and a sum of the brightness weights of all pixels in the square pixel array is zero.

Refer to both FIG. 4 and FIG. 6. FIG. 6 shows the brightness weights respectively corresponding to pixels in the square pixel array of FIG. 4. After the brightness weight of each pixel in the square pixel array is obtained, the first brightness difference is further generated based on the brightness and brightness weight of each pixel in the image block.

In one embodiment, a product of the brightness of each pixel in the image block and the brightness weight of each pixel is calculated. A sum of products of all the pixels in image block is divided by an absolute value of the brightness weight corresponding to the first edge pixel, to obtain the first brightness difference. Refer to both FIG. 4 and FIG. 6.

An expression for calculating the first brightness difference corresponding to the first edge pixel (represented by M) is:

$$F = (NW*1 + N*2 + NE*1 +$$
$$E*2 + SE*1 + S*2 + SW*1 + W*2 - M*12)/12.$$

After the first brightness difference is calculated, the first brightness difference is normalized. The normalized first brightness difference is mapped to obtain the to-be-processed color ratio, so that the to-be-processed color ratio falls within an interval of [0, 1] and is positively correlated with the first brightness difference. Refer to FIG. 7. FIG. 7 shows a mapping relationship between the to-be-processed color ratio and the first brightness difference. The horizontal axis in FIG. 7 represents the first brightness difference, and the vertical axis in FIG. 7 represents the to-be-processed color ratio.

To sum up, the method provides a method for generating the to-be-processed color ratio, which is a part of the detail anti-aliasing branch of the present disclosure to further generate the first color ratio in combination with the scaling factor.

In a same or another embodiment based on FIG. 3, operation 350 may be replaced with: multiplying a second color ratio by the color value of the first edge pixel to obtain a first color component, a sum of the second color ratio and the first color ratio being 1; multiplying the first color ratio by the color value of the target pixel to obtain a second color component; and summing the first color component and the second color component to obtain the first color value.

Exemplarily, the value of the first color ratio is p, the value of the second color ratio is 1-p, the color value of the first edge pixel is x, and the color value of the target pixel is x'. The first color value may be expressed by the following formula:

$$F = (1 - p)*x + p*x'.$$

F represents the calculated first color value.

To sum up, the method is a specific color mixing algorithm for each edge pixel provided by the detail anti-aliasing branch, to achieve anti-aliasing processing of edge pixels in the detail anti-aliasing branch.

Figure 8:
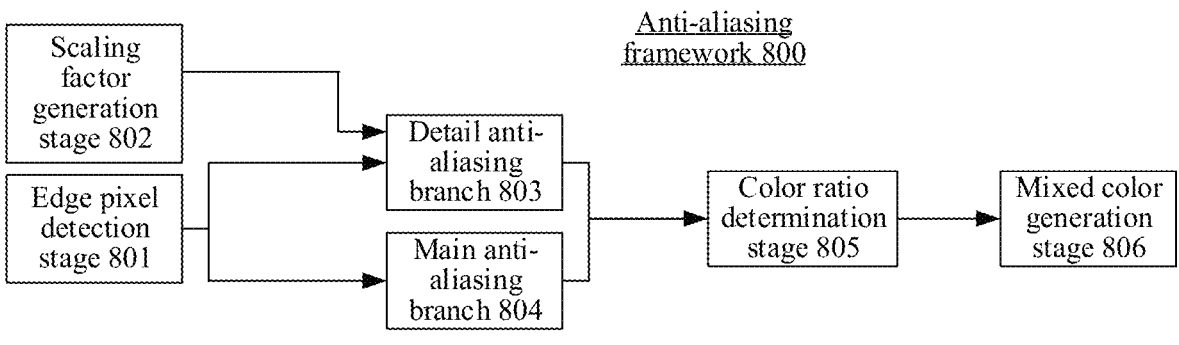
FIG. 8 is a schematic diagram of an image anti-aliasing framework according to another exemplary embodiment.

Based on the image anti-aliasing framework shown in FIG. 2, FIG. 8 is a schematic diagram of another image anti-aliasing framework according to the present disclosure. Compared with FIG. 2, a main difference lies in that a main anti-aliasing branch 804 is added in FIG. 8. An image anti-aliasing framework 800 includes an edge pixel detection stage 801, a scaling factor generation stage 802, a detail anti-aliasing branch 803, a main anti-aliasing branch 804, a color ratio determination stage 805, and a mixed color generation stage 806.

The edge pixel detection stage 801 is configured for detecting all edge pixels in an image in HDR space. In one embodiment, the edge pixel detection stage 801 is further configured for generating at least one linear edge based on all edge pixels. The Linear edge is formed by a plurality of adjacent edge pixels connected in series. All the edge pixels obtained in the edge pixel detection stage 801 are input to the detail anti-aliasing branch 803. The at least one linear edge obtained in the edge pixel detection stage 801 is input to the main anti-aliasing branch 804.

The scaling factor generation stage 802 is configured for generating scaling factors respectively corresponding to all edge pixels of the image in the HDR space. The scaling factor is configured for dynamically adjusting a color ratio of each edge pixel.

The detail anti-aliasing branch 803 is configured for generating color ratios of all edge pixels. For each edge pixel, in the detail anti-aliasing branch 803, a to-be-processed color ratio corresponding to the edge pixel is generated, and the to-be-processed color ratio of the edge pixel is adjusted based on a scaling factor corresponding to the edge pixel, to obtain a color ratio corresponding to the edge pixel.

The main anti-aliasing branch 804 is configured for generating the color ratios of the edge pixels on the linear edge. For each edge pixel on the linear edge, a color ratio corresponding to the edge pixel is generated based on the position of the edge pixel in the main anti-aliasing branch 804.

The color ratio determination stage 805 is configured for determining final color ratios of all edge pixels. For each edge pixel, a maximum value between a color ratio of the edge pixel generated through the detail anti-aliasing branch 803 and a color ratio of the edge pixel generated through the main anti-aliasing branch 804 is determined. The maximum value is determined as the final color ratio.

The mixed color generation stage 806 is configured for color mixing of all edge pixels of the image to obtain an image anti-aliasing effect. For each edge pixel, a target pixel for color mixing corresponding to the edge pixel is determined. A final color of the edge pixel is obtained by mixing based on a color of the edge pixel and a color of the target pixel in combination with the color ratio determined above. The color mixing is performed on all edge pixels of the image, to obtain an image undergone anti-aliasing.

Based on the anti-aliasing framework 800 shown in FIG. 8, in the same or another embodiment shown in FIG. 3, the image anti-aliasing method further includes the following operation S1 and operation S2, and operation 350 may be replaced with operation S3. Operation S1 is implemented by the main anti-aliasing branch 804 shown in FIG. 8, operation S2 is implemented by the color ratio determination stage 805, and operation S3 is implemented by the mixed color generation stage 806.

S1: Obtain, when the first edge pixel is configured for forming a linear edge, a third color ratio corresponding to the first edge pixel based on a position of the first edge pixel on the linear edge.

The linear edge includes a plurality of adjacent edge pixels.

In one embodiment, the linear edge is obtained by continuous iterative expansion to adjacent edge pixels. After one edge pixel is determined, it is detected whether a pixel adjacent to the edge pixel is an edge pixel. If so, the adjacent pixel is connected to the edge pixel in series. Expansion is carried out again based on the adjacent pixel. The iterative expansion stops when there is an adjacent pixel obtained by expansion that is not an edge pixel or an iteration threshold is reached. Finally, a linear edge is obtained.

In one embodiment, the third color ratio corresponding to the first edge pixel is obtained based on the position of the first edge pixel on the linear edge. Exemplarily, the linear edge includes ten pixels. The color of the five pixels on the left are close to the color of pixel below the linear edge. The color of the five pixels on the right are close to the color of pixels above the linear edge. Starting from the leftmost pixel, the color of the five pixels from left to right of the linear edge gradually deviate from the color of the pixels below. The color of the five pixels is mixed with that of the pixels above the linear edge. The color ratios corresponding to the five pixels gradually increase. For example, the color ratios are 0.1, 0.2, 0.3, 0.4, and 0.5.

Starting from the rightmost pixel, the color of the five pixels from right to left of the linear edge gradually deviate from the color of the pixels above. The color of the five pixels is mixed with that of the pixels below the linear edge. The color ratios corresponding to the five pixels gradually increase. For example, the color ratios are 0.1, 0.2, 0.3, 0.4, and 0.5.

S2: Determine a largest value between the first color ratio and the third color ratio as a maximum color ratio corresponding to the first edge pixel.

S3: Obtain a first color value by mixing based on a color value of the first edge pixel and a color value of the target pixel in combination with the maximum color ratio.

A fourth color ratio is multiplied by the color value of the first edge pixel to obtain a third color component. A sum of the fourth color ratio and the maximum color ratio is 1. The maximum color ratio is multiplied by the color value of the target pixel to obtain a fourth color component. The third color component and the fourth color component are summed to obtain the first color value.

Exemplarily, the value of the maximum color ratio is p, the value of the fourth color ratio is 1-p, the color value of the first edge pixel is x, and the color value of the target pixel is x'. The first color value may be expressed by the following formula:

$$F = (1 - p) * x + p * x'.$$

F represents the calculated first color value.

To sum up, the operations S1, S2, and S3 are actually related to the main anti-aliasing branch 804 shown in FIG. 8. The main anti-aliasing branch 804 is a branch for performing anti-aliasing on a linear edge. In fact, the main anti-aliasing branch cannot be applied to anti-aliasing in a highlight area of an image in HDR space, because the manner of mixing colors is linear mixing, and the transformation from HDR space to LDR space is a non-linear transformation.

For example, it is assumed that there is a traversal linear edge, the brightness of pixels above the linear edge is 1, and the brightness of pixels below the linear edge is 0.8. The brightness of the linear edge is linearly distributed from left to right from 1 to 0.8.

In HDR space, it is assumed that the brightness of the pixels above the linear edge of a highlight area is 10, which is much greater than 1, and the brightness of the pixels below the linear edge is 0.8. Upon calculation using an FXAA algorithm, the brightness of the linear edge is linearly distributed from left to right from 10 to 0.8. In this linear edge, the brightness of most edge pixels is greater than 1. In this case, during converting this linear edge from HDR space to LDR space through tone mapping, color values of most edge pixels are to be mapped to values close to 1. Tone mapping is non-linear mapping of colors. In fact, after tone mapping, jagged positions on the linear edge in the LDR space are offset rather than disappearing.

Figure 9:
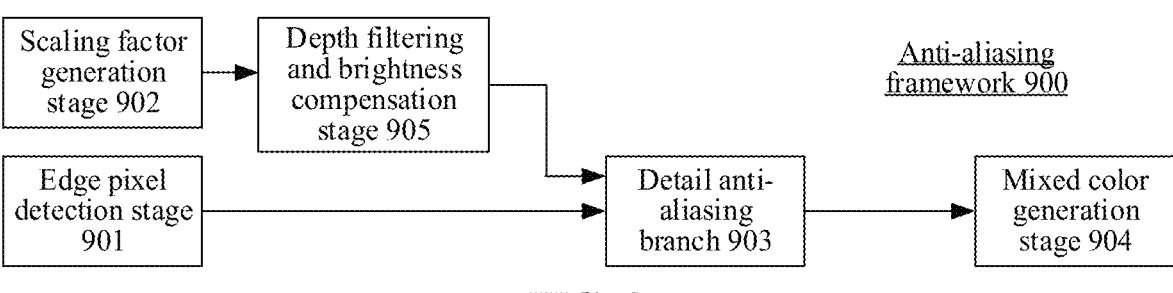
FIG. 9 is a schematic diagram of an image anti-aliasing framework according to another exemplary embodiment.

Based on the image anti-aliasing framework shown in FIG. 2, FIG. 9 is a schematic diagram of an image anti-aliasing framework 900 according to an exemplary embodiment of the present disclosure. Compared with FIG. 2, the main difference lies in that a depth filtering and brightness compensation stage 905 is added in FIG. 9. An edge pixel detection stage 901, a scaling factor generation stage 902, a detail anti-aliasing branch 903, and a mixed color generation stage 904 in the image anti-aliasing framework 900 are similar to the corresponding content shown in FIG. 2.

The depth filtering and brightness compensation stage 905 is configured for performing depth filtering on all pixels of an image in HDR space to obtain an area where depth information changes significantly. However, depth filtering only considers depth information and usually filters out highlight edges. Therefore, brightness compensation needs to be performed to compensate for the filtered highlight edges.

After the depth filtering and brightness compensation stage 905, an edge pixel cluster of the image is obtained. If a current pixel does not belong to the edge pixel cluster, a value of a scaling factor of the current pixel is set to 0. If the current pixel belongs to the edge pixel cluster, the previously calculated scaling factor is continued to be input to the detail anti-aliasing branch 903.

Based on the image anti-aliasing framework 900 shown in FIG. 9, in the same or another embodiment shown in FIG. 3, the following operation 321 and operation 322 are further included after operation 320.

Operation 321: Perform a depth filtering operation and a brightness compensation operation on the image to obtain an edge pixel cluster.

The depth filtering operation refers to an operation of filtering out areas in the image where depth changes insignificantly and retaining areas in the image where the depth changes significantly. In this case, the area where the depth changes significantly retained may be called a depth edge (an edge determined based on depth changes). After the image undergoes the depth filtering operation, the first edge pixel cluster is obtained. A depth value difference between a pixel in the first edge pixel cluster and a surrounding pixel reaches a threshold.

The depth filtering operation is based on the original image. The first edge pixel cluster is obtained after the depth filtering operation. Pixels having a depth value difference from surrounding pixels less than a threshold are filtered out through the depth filtering operation. Therefore, the first edge pixel cluster refers to a cluster composed of edge pixels determined from the original image based on depth information.

FIG. 10A is the original image. FIG. 10B is the image obtained after the depth filtering operation. It can be seen that the depth filtering operation not only filters textures of the wall and ground, but also filters luminous rectangles (no depth information of transparent objects is retained).

The brightness compensation operation refers to an operation of determining a pixel in an image other than the first edge pixel cluster as an edge pixel when a brightness environment of the pixel meets certain conditions. In this case, the edge pixel may be called a brightness edge. Brightness compensation is performed on the image undergone the depth filtering operation. An edge pixel obtained through the brightness compensation is added to a second edge pixel cluster.

The brightness compensation operation is performed based on the pixels filtered out by the depth filtering operation. A pixel having a brightness difference in the image block satisfying a threshold is selected from among the pixels filtered out by the depth operation and added to the second edge pixel cluster. Therefore, the second edge pixel cluster refers to a cluster composed of edge pixels determined based on the brightness information from the pixels filtered out by the depth filtering operation.

Exemplarily, for an $i^{th}$ pixel in the image other than the first edge pixel cluster, a pixel having a largest brightness value and a pixel having a smallest brightness value among a plurality of pixels in an image block where the $i^{th}$ pixel is located are determined. The $i^{th}$ pixel is added to the second edge pixel cluster when a brightness value difference between the pixel having the largest brightness value and the pixel having the smallest brightness value among the plurality of pixels in the image block where the $i^{th}$ pixel is located reaches an $i^{th}$ threshold. The $i^{th}$ pixel is any pixel in the image other than the first edge pixel cluster, and the first edge pixel cluster and the second edge pixel cluster together constitute the edge pixel cluster. The $i^{th}$ threshold is a preset threshold, and i is a positive integer. In one embodiment, the $i^{th}$ threshold is a preset brightness value difference threshold. In one embodiment, the same brightness value difference threshold is used for all pixels in the image other than the first edge pixel cluster to determine whether the pixels belong to the second edge pixel cluster.

Refer to FIG. 4. The pixel indicated by M in FIG. 4 may be understood as the $i^{th}$ pixel. In one embodiment, the pixel having the largest brightness value and the pixel having the smallest brightness value are determined from among all the pixels in the image block shown in FIG. 4. In one embodiment, the pixel having the largest brightness value and the pixel having the smallest brightness value are determined from among the plurality of pixels indicated by N, S, W, and E. In one embodiment, the pixel having the largest brightness value and the pixel having the smallest brightness value are determined from among the plurality of pixels indicated by NW, SW, NE, and SE.

FIG. 10C shows an image obtained by performing the brightness compensation operation after the depth filtering operation. It can be seen that the filtered luminous rectangle is back after the brightness compensation. The pixels of which brightness is not 0 shown in FIG. 10C undergone compensation constitute the edge pixel cluster.

Operation 322: Determine that the first edge pixel is a pixel in the edge pixel cluster.

The edge pixel cluster is a cluster of edge pixels determined from the image based on depth information and brightness information. Specifically, a depth edge is first determined based on the depth information from the original image through the depth filtering operation, and then a brightness edge is determined based on the brightness information from the pixels filtered out by the depth filtering operation. All depth edges and brightness edges together form the edge pixel cluster.

For example, the original image includes 50 pixels. 30 depth edges are determined based on depth information of the 50 pixels, and 5 brightness edges are determined from the 20 pixels excluding the 30 depth edges. A total of 30 depth edges and 5 brightness edges are obtained. 35 edges constitute the edge pixel cluster.

The edge pixel cluster is configured for setting scaling factors corresponding to other pixels in the image than the edge pixel cluster to 0. After it is determined that the first edge pixel belongs to the edge pixel cluster obtained in operation 321, the generated first scaling factor is continued to be used to scale the to-be-processed color ratio.

Through the depth filtering and brightness compensation operations, the edge pixel cluster is obtained. The edge pixel cluster includes edge pixels obtained through the depth filtering and the brightness compensation. After it is determined that the first edge pixel falls within the edge pixel cluster, it is determined to use the calculated first scaling factor. If the first edge pixel does not fall within the edge pixel cluster, the scaling factor of the first edge pixel is set to 0, and subsequent operations continue to be performed.

In fact, operation 321 and operation 322 are to filter out pixels having relatively low brightness among a plurality of edge pixels obtained in the initial edge detection stage, to prevent low clarity of these low-brightness pixels due to anti-aliasing on these low-brightness pixels. In other words, the depth filtering and brightness compensation aims to retain true highlight areas and filter out unnecessary low-brightness areas, so that large scaling factors are used only for highlight areas, and values of scaling factors for other areas are 0. The depth filtering and brightness compensation does not affect the edge detection stage. In other words, the depth filtering and brightness compensation does not affect the main anti-aliasing branch.

FIG. 11 shows an anti-aliasing framework 1100 according to an exemplary embodiment of the present disclosure. The image anti-aliasing framework 1100 may be obtained by combining the anti-aliasing framework 200, anti-aliasing framework 800, and anti-aliasing framework 900. In the anti-aliasing framework 1100, an edge pixel detection stage 1101, a scaling factor generation stage 1102, a detail anti-aliasing branch 1103, a main anti-aliasing branch 1104, a color ratio determination stage 1105, a mixed color generation stage 1106, and a depth filtering and brightness compensation stage 1107 have all been introduced in detail. Details are not described herein again.

FIGS. 12A and 12B shows an anti-aliasing effect comparison diagram. FIG. 12A is a schematic diagram of an anti-aliasing effect of an FXAA solution that merges rendering processes in a related technology. FIG. 12A shows aliasing in a rectangular box 1201. A value of a sub-pixel anti-aliasing quality parameter (SubPixQuality) of the FXAA solution used in FIG. 12A is equal to 1. It can be seen that in FIG. 12A, the overall image is clear. As can be seen from the partial enlargement on the right, the aliasing in an image highlight area is more distinct.

FIG. 12B is a schematic diagram of an effect of anti-aliasing using the anti-aliasing framework 1100 shown in FIG. 11. FIG. 12B shows the aliasing in the rectangular box 1202. It can be seen that in FIG. 12B, the clarity of the overall image is the same as that of FIG. 12A. As can be seen from the partial enlargement on the right, there is no aliasing in the highlight area of the image, the anti-aliasing effect is better, and the optimization effect is significant.

Figure 13A:
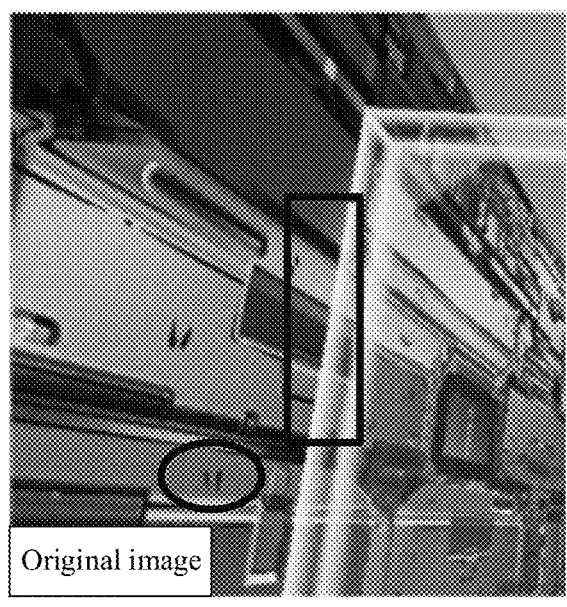
FIG. 13A-FIG. 13D are schematic diagrams of comparison of an anti-aliasing effect between an FXAA solution that splits rendering processes according to an exemplary embodiment.
Figure 13B:
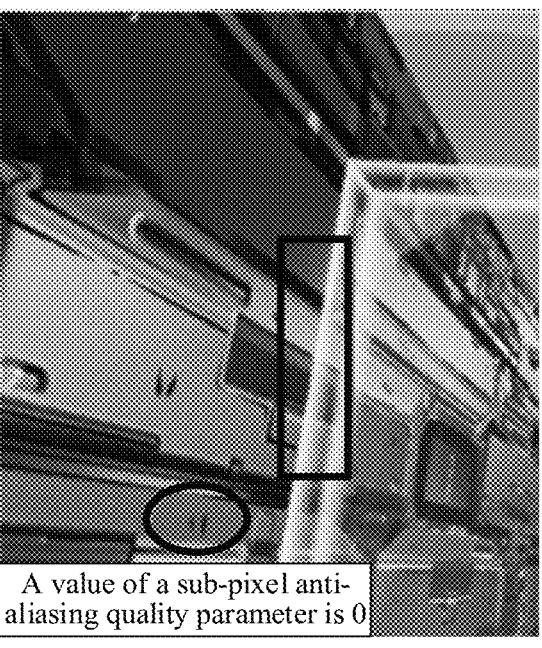
Figure 13C:
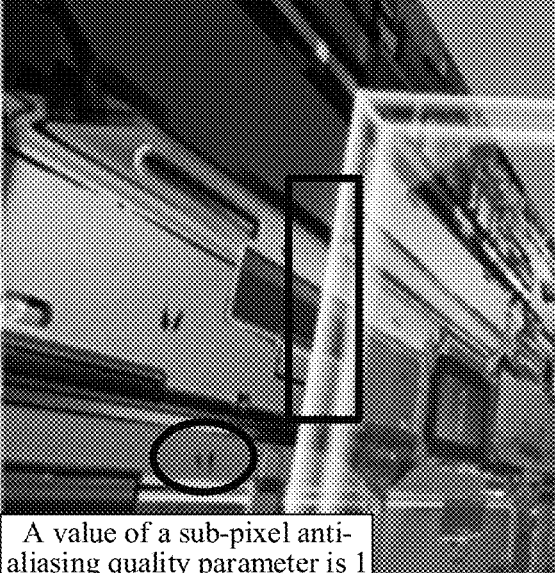
Figure 13D:
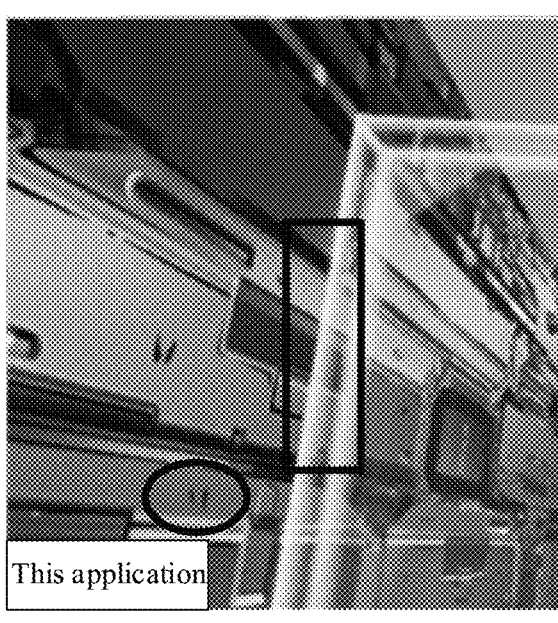

FIG. 13A and FIG. 13B is another anti-aliasing effect comparison diagram. FIG. 13A shows an original image for anti-aliasing effect comparison. FIG. 13B shows an anti-aliasing effect of an FXAA solution that splits rendering processes when a sub-pixel anti-aliasing quality parameter is equal to 0. FIG. 13C shows an anti-aliasing effect of an FXAA solution that splits rendering processes when the sub-pixel anti-aliasing quality parameter is equal to 1. FIG. 13D shows an anti-aliasing effect of an anti-aliasing method according to the present disclosure.

It can be seen that in a highlight part shown in a rectangular box area, the anti-aliasing effect of the present disclosure in the highlight part is the same as that when the sub-pixel anti-aliasing quality parameter is 1, and is better than that when the sub-pixel anti-aliasing quality parameter is 0. It can be seen that the clarity of image details of present disclosure shown in an elliptical area is the same as that when the sub-pixel anti-aliasing quality parameter is 0, and is clearer than that when the sub-pixel anti-aliasing quality parameter is 1.

Through tests, the anti-aliasing solution provided by the present disclosure can achieve an excellent anti-aliasing effect without consuming excessive performance.

In a test using a common mobile terminal on the market, during tone mapping and anti-aliasing by using the FXAA solution that merges rendering processes in a related technology, the rendering process of the mobile terminal takes a total of 2.86 ms, the bandwidth for reading data is 1.759 MB, and the bandwidth for writing data is 68 KB.

In a test using the same mobile terminal, during tone mapping and anti-aliasing by using the anti-aliasing solution of the present disclosure, the rendering process of the mobile terminal takes a total of 2.85 ms, the bandwidth for reading data is 1.765 MB, and the bandwidth for writing data is 69 KB.

It can be seen that the anti-aliasing solution provided by the present disclosure is almost the same in values of various consumption indicators as the FXAA solution that merges rendering processes in the related technology, but significantly enhances the anti-aliasing effect.

Figure 14:
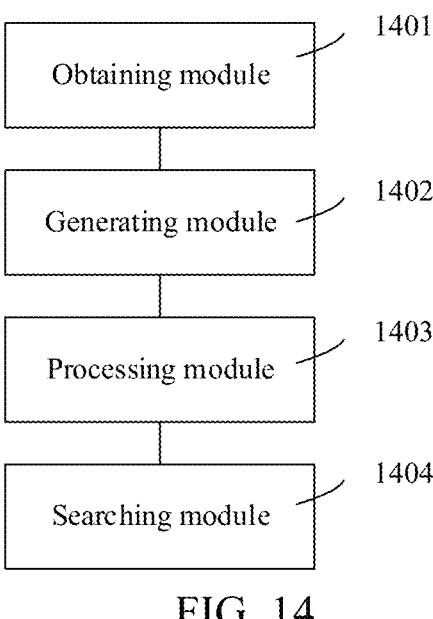
FIG. 14 is a block diagram of a structure of an image anti-aliasing apparatus according to an exemplary embodiment.

FIG. 14 is a block diagram of a structure of an image anti-aliasing apparatus according to an exemplary embodiment. The apparatus includes:

an obtaining module 1401, configured to obtain a first edge pixel of an image in HDR space;

a generating module 1402, configured to generate a first scaling factor based on a local brightness environment of the first edge pixel, the generating module 1402 being configured to generate, based on brightness values of a plurality of pixels in an image block where the first edge pixel is located, a to-be-processed color ratio corresponding to the first edge pixel; and a processing module 1403, configured to scale the to-be-processed color ratio based on the first scaling factor to obtain a first color ratio.

The processing module 1403 is configured to obtain a first color value by mixing based on a color value of the first edge pixel and a color value of a target pixel in combination with the first color ratio. The target pixel is a pixel having a largest color value difference from the first edge pixel among a plurality of surrounding pixels of the first edge pixel.

The processing module 1403 is configured to update the first color value to the color value of the first edge pixel.

In a same or another embodiment, the generating module 1402 is further configured to generate the first scaling factor based on a brightness value of a first surrounding pixel and a brightness value of a second surrounding pixel. The first surrounding pixel is a pixel having a largest brightness value among the plurality of pixels in the image block where the first edge pixel is located, and the second surrounding pixel is a pixel having a smallest brightness value among the plurality of pixels in the image block where the first edge pixel is located.

In a same or another embodiment, the generating module 1402 is further configured to input the brightness value of the first surrounding pixel and the brightness value of the second surrounding pixel into a scaling function to obtain the first scaling factor. The scaling function satisfies: the greater the brightness value of the first surrounding pixel, the larger the first scaling factor; the smaller the brightness value of second surrounding pixel, the smaller the first scaling factor; and when the brightness value of the second surrounding pixel is zero, a value of the first scaling factor is equal to zero.

In a same or another embodiment, the brightness value of the first surrounding pixel is a first brightness value, and the brightness value of the second surrounding pixel is a second brightness value. The generating module 1402 is further configured to multiply the first brightness value by the second brightness value to obtain a first sub-scaling factor; use the second brightness value as a second sub-scaling factor; and sum the first sub-scaling factor and the second sub-scaling factor and then perform normalization processing to obtain the first scaling factor.

In a same or another embodiment, the generating module 1402 is further configured to obtain a plurality of brightness weights of the plurality of pixels in the image block where the first edge pixel is located, the plurality of pixels in the image block being in one-to-one correspondence with the plurality of brightness weights; generate a first brightness difference based on brightness and a brightness weight of each pixel in the image block, the first brightness difference being configured for characterizing the local brightness environment of the first edge pixel; and map the first brightness difference to obtain the to-be-processed color ratio.

In a same or another embodiment, the image block is a square pixel array centered on the first edge pixel. The plurality of brightness weights of the plurality of pixels in the image block satisfy the following conditions:

pixels in the square pixel array that are at a same distance from the first edge pixel have a same brightness weight;

pixels in the square pixel array that are closer to the first edge pixel have smaller brightness weights;

the brightness weights corresponding to other pixels in the square pixel array than the first edge pixel are positive numbers, and the brightness weight corresponding to the first edge pixel is a negative number; and a sum of the brightness weights of all pixels in the square pixel array is zero.

In a same or another embodiment, the generating module 1402 is further configured to calculate a product of the brightness of each pixel in the image block and the brightness weight of the pixel; and divide a sum of products of all the pixels in image block by an absolute value of the brightness weight corresponding to the first edge pixel, to obtain the first brightness difference.

In a same or another embodiment, the generating module 1402 is further configured to normalize the first brightness difference; and map the normalized first brightness difference to obtain the to-be-processed color ratio, so that the to-be-processed color ratio falls within a closed interval from zero to one and is positively correlated with the first brightness difference.

In a same or another embodiment, the processing module 1403 is further configured to multiply a second color ratio by the color value of the first edge pixel to obtain a first color component, a sum of the second color ratio and the first color ratio being 1; multiply the first color ratio by the color value of the target pixel to obtain a second color component; and sum the first color component and the second color component to obtain the first color value.

In a same or another embodiment, the generating module 1402 is further configured to obtain, when the first edge pixel is configured for forming a linear edge, a third color ratio corresponding to the first edge pixel based on a position of the first edge pixel on the linear edge; and determine a largest value between the first color ratio and the third color ratio as a maximum color ratio corresponding to the first edge pixel. The processing module 1403 is further configured to obtain a first color value by mixing based on a color value of the first edge pixel and a color value of a target pixel in combination with the maximum color ratio. The linear edge includes a plurality of adjacent edge pixels.

In a same or another embodiment, the obtaining module 1401 is further configured to obtain an image in HDR space; obtain, for a $j^{th}$ pixel of the image, a pixel having a largest brightness value and a pixel having a smallest brightness value among a plurality of pixels in an image block where the $j^{th}$ pixel is located; determine that the $j^{th}$ pixel is an edge pixel when a brightness value difference between the pixel having the largest brightness value and the pixel having the smallest brightness value among the pixels in of image block where the $j^{th}$ pixel is located reaches a $j^{th}$ threshold; and determine a plurality of edge pixels of the image. The $j^{th}$ pixel is any pixel in the image.

In a same or another embodiment, the processing module 1403 is further configured to perform a depth filtering operation and a brightness compensation operation on the image to obtain an edge pixel cluster; and determine that the first edge pixel is a pixel in the edge pixel cluster. The edge pixel cluster is configured for setting scaling factors corresponding to other pixels in the image than the edge pixel cluster to zero.

In a same or another embodiment, the processing module 1403 is further configured to perform the depth filtering operation on the image to obtain a first edge pixel cluster, a depth value difference between each pixel in the first edge pixel cluster and a surrounding pixel reaching a threshold; determine, for an $i^{th}$ pixel in the image other than the first edge pixel cluster, a pixel having a largest brightness value and a pixel having a smallest brightness value among a plurality of pixels in an image block where the $i^{th}$ pixel is located; and add the $i^{th}$ pixel to a second edge pixel cluster when a brightness value difference between the pixel having the largest brightness value and the pixel having the smallest brightness value among the plurality of pixels in the image block where the $i^{th}$ pixel is located reaches an $i^{th}$ threshold. The $i^{th}$ pixel is any pixel in the image other than the first edge pixel cluster, and the first edge pixel cluster and the second edge pixel cluster together constitute the edge pixel cluster.

In a same or another embodiment, the apparatus further includes a searching module 1404. The searching module 1404 is configured to obtain, by searching, an edge direction corresponding to the first edge pixel, the edge direction being a vertical direction or a horizontal direction; and determine, as the target pixel, a pixel that crosses an edge and is located at a shortest distance from the first edge pixel in a direction perpendicular to the edge direction.

In view of the above, by generating a scaling factor of each edge pixel of an image in HDR space, a customized scaling factor is generated for each edge pixel, so that color mixing of each edge pixel is based on its own scaling factor, thereby effectively solving the contradiction between clarity of image details and an anti-aliasing effect of a highlight area caused by using only one sub-pixel anti-aliasing quality parameter for an entire image frame in the detail anti-aliasing branch.

The anti-aliasing apparatus of the present disclosure achieves a good anti-aliasing effect on the edge of the highlight area and ensures the clarity of image details through the detail anti-aliasing branch of the FXAA solution that merges rendering processes.

Figure 15:
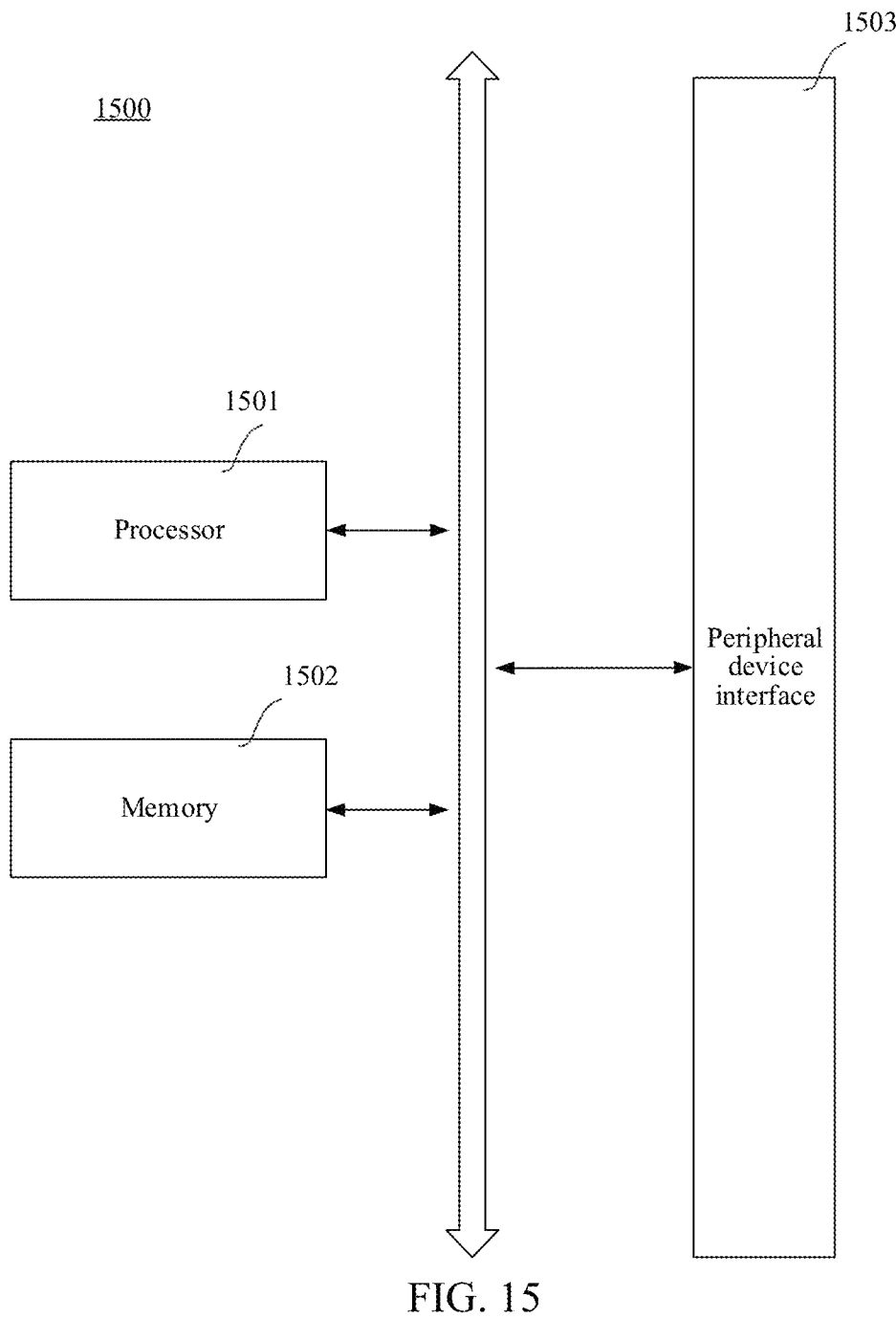
FIG. 15 is a block diagram of a structure of a computer device according to an exemplary embodiment.

FIG. 15 is a block diagram of a structure of a computer device 1500 according to an exemplary embodiment of the present disclosure. The computer device 1500 may be a portable mobile terminal, such as a smartphone, a tablet computer, a moving picture experts group audio layer III (MP3) player, a moving picture experts group audio layer IV (MP4) player, a notebook computer, or a desktop computer. The computer device 1500 may also be referred to as another name such as user equipment, a portable terminal, a laptop terminal, or a desktop terminal.

Generally, the computer device 1500 includes: a processor 1501 and a memory 1502.

The processor 1501 may include one or more processing cores, for example, a 4-core processor or an 8-core processor. The processor 1501 may be implemented in at least one hardware form of a digital signal processor (DSP), a field-programmable gate array (FPGA), and a programmable logic array (PLA). The processor 1501 may also include a main processor and a coprocessor. The main processor is a processor configured to process data in an awake state, and is also referred to as a central processing unit (CPU). The coprocessor is a low-power processor configured to process data in a standby state. In some embodiments, the processor 1501 may have a graphics processing unit (GPU) integrated thereon. The GPU is configured to render and draw content to be displayed on a display screen. In some embodiments, the processor 1501 may further include an artificial intelligence (AI) processor. The AI processor is configured to process computing operations related to machine learning.

The memory 1502 may include one or more computer-readable storage media. The computer-readable storage medium may be non-transient. The memory 1502 may further include a high-speed random access memory and a nonvolatile memory, for example, one or more disk storage devices or flash storage devices. In some embodiments, the non-transitory computer-readable storage medium in the memory 1502 is configured to store at least one instruction. The at least one instruction is configured to be executed by the processor 1501 to implement the image anti-aliasing method provided in the method embodiments of the present disclosure.

In some embodiments, the computer device 1500 may further includes: a peripheral device interface 1503 and at least one peripheral. A person skilled in the art may understand that the structure shown in FIG. 15 constitutes no limitation on the computer device 1500. The computer device may include more or fewer components than those shown in FIG. 15, or some components may be combined, or a different component deployment may be used.

The present disclosure further provides a computer-readable storage medium. The storage medium has at least one instruction, at least one program, or a code set or an instruction set stored thereon. The at least one instruction, the at least one program, or the code set or the instruction set is loaded and executed by the processor to implement the image anti-aliasing method provided in the method embodiments.

The present disclosure provides a computer program product or a computer program. The computer program product or the computer program includes computer instructions stored on a computer-readable storage medium. A processor of a computer device reads the computer instructions from the computer-readable storage medium. The processor executes the computer instructions to cause the computer device to perform the image anti-aliasing method according to the method embodiments.

What is claimed is:

1. A method for image anti-aliasing, performed by at least one processor, the method comprising:

obtaining a first edge pixel of an image in a high-dynamic range (HDR) space;

determining a first scaling factor based on a local brightness environment of the first edge pixel;

determining a color ratio corresponding with the first edge pixel based on brightness values of a plurality of pixels in an image block where the first edge pixel is located;

scaling the color ratio based on the first scaling factor to obtain a first color ratio;

obtaining a first color value based on a color value of the first edge pixel, a color value of a target pixel, and the first color ratio, wherein the target pixel has a large color value difference from the first edge pixel among a plurality of surrounding pixels of the first edge pixel; and updating the first color value to the color value of the first edge pixel.

2. The method according to claim 1, wherein the determining the first scaling factor comprises:

generating the first scaling factor based on a first brightness value of a first surrounding pixel and a second brightness value of a second surrounding pixel, the first surrounding pixel having a largest brightness value among the plurality of pixels in the image block where the first edge pixel is located, and the second surrounding pixel having a smallest brightness value among the plurality of pixels in the image block where the first edge pixel is located.

3. The method according to claim 2, wherein the generating the first scaling factor comprises:

inputting the first brightness value of the first surrounding pixel and the second brightness value of the second surrounding pixel into a scaling function to obtain the first scaling factor, wherein the scaling function determines the first scaling factor based on one or more of the following:

a value of the first scaling factor is directly proportional to the first brightness value of the first surrounding pixel;

the value of the first scaling factor is directly proportional to the second brightness value of the second surrounding pixel; and the value of the first scaling factor is zero when the second brightness value of the second surrounding pixel is zero.

4. The method according to claim 3, wherein the inputting comprises:

multiplying the first brightness value by the second brightness value to obtain a first sub-scaling factor;

using the second brightness value as a second sub-scaling factor; and summing the first sub-scaling factor and the second sub-scaling factor and then performing normalization processing to obtain the first scaling factor.

5. The method according claim 1, wherein the determining the color ratio corresponding to the first edge pixel comprises:

obtaining a plurality of brightness weights corresponding to the plurality of pixels in the image block where the first edge pixel is located;

characterizing the local brightness environment of the first edge pixel by generating a first brightness difference based on a brightness value of each pixel and a corresponding brightness weight of each pixel in the image block; and mapping the first brightness difference to obtain the color ratio.

6. The method according to claim 5, wherein the image block is a square pixel array centered on the first edge pixel; and wherein the plurality of brightness weights corresponding to the plurality of pixels in the image block satisfy one or more of the following:

pixels in the square pixel array that are at a same distance from the first edge pixel have a same brightness weight;

pixels in the square pixel array that are closer to the first edge pixel have smaller brightness weights;

when the brightness weights corresponding to pixels other than the first edge pixel in the square pixel array are positive numbers, then the brightness weight corresponding to the first edge pixel is a negative number; and a sum of the brightness weight of each pixel in the square pixel array is zero.

7. The method according to claim 6, wherein the generating the first brightness difference comprises:

calculating a product of the brightness value of each pixel in the image block and the brightness weight of each pixel; and obtaining the first brightness difference by dividing a sum of products of all the pixels in the image block by an absolute value of the brightness weight corresponding to the first edge pixel.

8. The method according to claim 7, wherein the method further comprises:

normalizing the first brightness difference; and wherein the mapping the first brightness difference to obtain the color ratio comprises:

mapping the normalized first brightness difference to obtain the color ratio, wherein the color ratio is within a closed interval from zero to one and is positively correlated with the first brightness difference.

9. The method according to claim 1, wherein the obtaining the first color value comprises:

multiplying a second color ratio by the color value of the first edge pixel to obtain a first color component, wherein a sum of the second color ratio and the first color ratio is one;

multiplying the first color ratio by the color value of the target pixel to obtain a second color component; and summing the first color component and the second color component to obtain the first color value.

10. The method according to claim 1, wherein the method further comprises:

when the first edge pixel is configured for forming a linear edge, obtaining a third color ratio corresponding to the first edge pixel based on a position of the first edge pixel on the linear edge;

determining a maximum color ratio corresponding to the first edge pixel between the first color ratio and the third color ratio; and the obtaining the first color value based on the color value of the first edge pixel, the color value of the target pixel, and the first color ratio comprises:

obtaining the first color value based on the color value of the first edge pixel, the color value of the target pixel, and the maximum color ratio, wherein the linear edge comprises a plurality of adjacent edge pixels.

11. The method according to claim 1, subsequent to determining the first scaling factor, the method further comprises:

performing a depth filtering operation and a brightness compensation operation on the image to obtain an edge pixel cluster; and determining that the first edge pixel is located in the edge pixel cluster, wherein the edge pixel cluster is configured for setting scaling factors corresponding to other pixels in the image than the edge pixel cluster to zero.

12. The method according to claim 1, wherein, before the obtaining the first color value, the method comprises:

obtaining an edge direction corresponding to the first edge pixel, the edge direction being a vertical direction or a horizontal direction; and determining, as the target pixel, a pixel that crosses an edge and is located at a shortest distance from the first edge pixel in a direction perpendicular to the edge direction.

13. An apparatus for image anti-aliasing, the apparatus comprising:

at least one memory configured to store program code; and at least one processor configured to read the program code and operate as instructed by the program code, the program code comprising:

first obtaining code configured to cause the at least one first processor to obtain a first edge pixel of an image in a high-dynamic range (HDR) space;

first determining code configured to cause the at least one first processor to determine a first scaling factor based on a local brightness environment of the first edge pixel;

second determining code configured to cause the at least one first processor to determine a color ratio corresponding with the first edge pixel based on brightness values of a plurality of pixels in an image block where the first edge pixel is located;

first scaling code configured to cause the at least one first processor to scale the color ratio based on the first scaling factor to obtain a first color ratio;

second obtaining code configured to cause the at least one first processor to obtain a first color value based on a color value of the first edge pixel, a color value of a target pixel, and the first color ratio, wherein the target pixel has a large color value difference from the first edge pixel among a plurality of surrounding pixels of the first edge pixel; and first updating code configured to cause the at least one first processor to update the first color value to the color value of the first edge pixel.

14. The apparatus of claim 13, wherein the first determining code comprises:

first generating code configured to cause the at least one first processor to generate the first scaling factor based on a first brightness value of a first surrounding pixel and a second brightness value of a second surrounding pixel, the first surrounding pixel having a largest brightness value among the plurality of pixels in the image block where the first edge pixel is located, and the second surrounding pixel having a smallest brightness value among the plurality of pixels in the image block where the first edge pixel is located.

15. The method of claim 14, wherein the first determining code further comprises:

first inputting code configured to cause the at least one first processor to input the first brightness value of the first surrounding pixel and the second brightness value of the second surrounding pixel into a scaling function to obtain the first scaling factor, wherein the scaling function determines the first scaling factor based on one or more of the following:

a value of the first scaling factor is directly proportional to the first brightness value of the first surrounding pixel;

the value of the first scaling factor is directly proportional to the second brightness value of the second surrounding pixel; and the value of the first scaling factor is zero when the second brightness value of the second surrounding pixel is zero.

16. The apparatus of claim 15, wherein the first inputting code comprises:

first multiplying code configured to cause the at least one first processor to multiply the first brightness value by the second brightness value to obtain a first sub-scaling factor;

first using code configured to cause the at least one first processor to use the second brightness value as a second sub-scaling factor; and first summing code configured to cause the at least one first processor to sum the first sub-scaling factor and the second sub-scaling factor and then performing normalization processing to obtain the first scaling factor.

17. The apparatus of claim 13, wherein the second determining code comprises:

third obtaining code configured to cause the at least one first processor to obtain a plurality of brightness weights corresponding to the plurality of pixels in the image block where the first edge pixel is located;

first characterizing code configured to cause the at least one first processor to characterize the local brightness environment of the first edge pixel by generating a first brightness difference based on a brightness value of each pixel and a corresponding brightness weight of each pixel in the image block; and first mapping code configured to cause the at least one first processor to map the first brightness difference to obtain the color ratio.

18. The apparatus of claim 17, wherein the image block is a square pixel array centered on the first edge pixel; and wherein the plurality of brightness weights corresponding to the plurality of pixels in the image block satisfy one or more of the following:

pixels in the square pixel array that are at a same distance from the first edge pixel have a same brightness weight;

pixels in the square pixel array that are closer to the first edge pixel have smaller brightness weights;

when the brightness weights corresponding to pixels other than the first edge pixel in the square pixel array are positive numbers, then the brightness weight corresponding to the first edge pixel is a negative number; and a sum of the brightness weight of each pixel in the square pixel array is zero.

19. The apparatus of claim 18, wherein the first characterizing code comprises:

first calculating code configured to cause the at least one first processor to calculate a product of the brightness value of each pixel in the image block and the brightness weight of each pixel; and fourth obtaining code configured to cause the at least one first processor to obtain the first brightness difference by dividing a sum of products of all the pixels in the image block by an absolute value of the brightness weight corresponding to the first edge pixel.

20. A non-transitory computer-readable medium storing program code which, when executed by one or more processors of a device for image anti-aliasing, cause the one or more processors to at least:

obtain a first edge pixel of an image in a high-dynamic range (HDR) space;

determine a first scaling factor based on a local brightness environment of the first edge pixel;

determine a color ratio corresponding with the first edge pixel based on brightness values of a plurality of pixels in an image block where the first edge pixel is located;

scale the color ratio based on the first scaling factor to obtain a first color ratio;

obtain a first color value based on a color value of the first edge pixel, a color value of a target pixel, and the first color ratio, wherein the target pixel has a large color value difference from the first edge pixel among a plurality of surrounding pixels of the first edge pixel; and update the first color value to the color value of the first edge pixel.

* * * * *